United States Patent
Hashimoto

(10) Patent No.: US 8,959,834 B2
(45) Date of Patent: Feb. 24, 2015

(54) PLANT CULTIVATION CONTAINER

(75) Inventor: Masaki Hashimoto, Ibaraki (JP)

(73) Assignee: Suntory Holdings Limited, Osaka (JP)

( * ) Notice: Subject to any disclaimer, the term of this patent is extended or adjusted under 35 U.S.C. 154(b) by 79 days.

(21) Appl. No.: 13/505,318

(22) PCT Filed: Nov. 8, 2010

(86) PCT No.: PCT/JP2010/069846
§ 371 (c)(1),
(2), (4) Date: Jul. 12, 2012

(87) PCT Pub. No.: WO2011/058951
PCT Pub. Date: May 19, 2011

(65) Prior Publication Data
US 2012/0272573 A1     Nov. 1, 2012

(30) Foreign Application Priority Data
Nov. 10, 2009  (JP) ................................. 2009-257066

(51) Int. Cl.
*A01G 31/00*     (2006.01)
*A01G 9/02*      (2006.01)

(52) U.S. Cl.
CPC ..................................... *A01G 9/025* (2013.01)
USPC ................................................... 47/63; 47/79

(58) Field of Classification Search
USPC ........................ 47/80, 79, 59 R, 60, 63, 66.5
See application file for complete search history.

(56) References Cited

U.S. PATENT DOCUMENTS

| | | | | |
|---|---|---|---|---|
| 4,961,284 A | * | 10/1990 | Williams | 47/66.5 |
| 7,080,482 B1 | * | 7/2006 | Bradley | 47/60 |
| D643,774 S | | 8/2011 | Hashimoto | |
| D643,775 S | | 8/2011 | Hashimoto | |
| D644,560 S | * | 9/2011 | Hashimoto | D11/143 |
| D644,561 S | * | 9/2011 | Hashimoto | D11/143 |
| D646,193 S | * | 10/2011 | Hashimoto | D11/143 |
| D650,309 S | * | 12/2011 | Hashimoto | D11/155 |

(Continued)

FOREIGN PATENT DOCUMENTS

| | | |
|---|---|---|
| CN | 85 2 03216 | 7/1986 |
| CN | 101371643 | 2/2009 |

(Continued)

OTHER PUBLICATIONS

Search report from E.P.O., mailed Jul. 2, 2014.

*Primary Examiner* — Kristen C Hayes
(74) *Attorney, Agent, or Firm* — Greenblum & Bernstein, P.L.C.

(57) ABSTRACT

A plant cultivation container includes a container body having: a plant cultivation space with an opening for planting a plant formed in a front face thereof; and a water reservoir portion for pooling plant cultivation water formed in a lower portion of the plant cultivation space, in which container a water-absorbing plant cultivation flooring material is mounted in the plant cultivation space so that a part of the plant cultivation flooring material is positioned inside the water reservoir portion. One of right and left walls of the container body disposed at right and left ends, respectively, of a front face of the container body is provided with an engaging portion, and the other of the right and left walls is provided with an engaged portion engageable with the engaging portion of another container body, such that a relative angle between two adjacent container bodies is changeable.

12 Claims, 7 Drawing Sheets

(56) References Cited

U.S. PATENT DOCUMENTS

| | | | |
|---|---|---|---|
| D651,937 S | 1/2012 | Hashimoto | |
| 8,250,804 B2* | 8/2012 | Chang | 47/39 |
| 8,646,205 B2* | 2/2014 | Cho | 47/66.6 |
| 2010/0095586 A1* | 4/2010 | Sichello | 47/65.9 |
| 2010/0186295 A1 | 7/2010 | Rodrigues | |
| 2011/0036008 A1* | 2/2011 | Hashimoto et al. | 47/82 |
| 2011/0219687 A1* | 9/2011 | Keats | 47/65.6 |
| 2011/0252704 A1* | 10/2011 | Cho | 47/66.6 |
| 2013/0152467 A1* | 6/2013 | Chang | 47/82 |

FOREIGN PATENT DOCUMENTS

| | | |
|---|---|---|
| DE | 19753749 | 6/1999 |
| GB | 2127872 | 4/1984 |
| GB | 2400119 | 10/2004 |
| GB | 2449995 | 12/2008 |
| JP | 3-37836 | 4/1991 |
| JP | 2001-327222 | 11/2001 |
| JP | 2003-325052 | 11/2003 |
| JP | 2006-42775 | 2/2006 |
| JP | 2009-45015 | 3/2009 |
| WO | 2007/084020 | 7/2007 |

* cited by examiner (a)

(b)

PLANT CULTIVATION CONTAINER

TECHNICAL FIELD

The present invention relates to a plant cultivation container including a container body having: a plant cultivation space with an opening for planting a plant formed in a front face thereof; and a water reservoir portion for pooling plant cultivation water formed in a lower portion of the plant cultivation space, in which container a water-absorbing plant cultivation flooring material is mounted in the plant cultivation space so that a part of the plant cultivation flooring material is positioned inside the water reservoir portion.

BACKGROUND ART

Such plant cultivation containers are applied to wall greening structures or the like of various buildings, for the purpose of suppressing heat-island effect in urban areas, enhancing urban landscapes, and reducing thermal load around outer walls by suppressing an increase of outer wall temperature caused by direct sunlight (see Patent Document 1).

CITATION LIST

Patent Literature

Patent Document 1: Japanese Unexamined Patent Application Publication No. 2009-45015

SUMMARY OF INVENTION

Technical Problem

Though the conventional plant cultivation containers can form a planar wall, it was difficult to form a curved wall. For example, in a case of an outer wall portion having a curvature in a lateral direction, such as a corner or the like of a building, it was difficult to dispose the plant cultivation containers along the curved surface, and thus when the conventional plant cultivation containers are disposed, there are some cases in which appearance of the building is spoiled.

Accordingly, an object of the present invention is to provide a plant cultivation container which can be disposed along not only the planar outer wall, but also the outer wall having a curvature in the lateral direction.

Solution to Problem

A first feature of the plant cultivation container according to the present invention lies in that it includes a container body having: a plant cultivation space with an opening for planting a plant formed in a front face thereof; and a water reservoir portion for pooling plant cultivation water formed in a lower portion of the plant cultivation space, in which container a water-absorbing plant cultivation flooring material is mounted in the plant cultivation space so that a part of the plant cultivation flooring material is positioned inside the water reservoir portion, wherein one of right and left walls of the container body disposed at right and left ends, respectively, of a front face of the container body is provided with an engaging portion, and the other of the right and left walls is provided with an engaged portion engageable with the engaging portion of another container body, and when a plurality of the container bodies are arranged in a lateral direction, two adjacent container bodies are engageable with each other while a relative angle therebetween is changeable.

<Effect>

According to the present configuration, the relative angle between the two adjacent container bodies is changeable, and thus in a case where a plurality of the plant cultivation containers are arranged in the lateral direction, those plant cultivation containers may be arranged linearly, or may be arranged along a desired curvature.

Further, for example, when the container bodies are stacked in a vertical direction, the wall formed of the plant cultivation containers can be made in not only a planar shape, but also a curved shape having a curvature in the lateral direction, by further stacking the plant cultivation containers on the plant cultivation containers arranged in a linear shape or curved shape.

Therefore, with the plant cultivation container according to the present configuration, in the case of the outer wall portion having a curvature in the lateral direction, such as the corner or the like of the building, the plant cultivation containers can be disposed along the curved surface, and thus appearance of the building is not spoiled.

A second feature of the plant cultivation container according to the present invention lies in that a front end portion of one of the right and left walls of the container body is provided with the engaging portion and a front end portion of the other is provided with the engaged portion engageable with the engaging portion of another container body.

<Effect>

According to this configuration, unlike a case in which the engaging portion and the engaged portion are provided in respective intermediate portions or the like of right and left walls, when a relative angle is changed in a direction that makes the front faces of the two adjacent container bodies close to each other, the front end portions of the respective side walls of the container body are never brought into contact with each other. Accordingly, as compared with a case in which the engaging portion and the engaged portion are provided in the respective intermediate portions of the like of the right and left walls, the container body has a large degree of freedom in changing the relative angle.

A third feature of the plant cultivation container according to the present invention lies in that the engaging portion and the engaged portion are formed along an entire height of the container body.

<Effect>

According to the present configuration, the engaging portion and the engaged portion are formed along the entire height of the container body. Therefore, when the container bodies are arranged side by side while engaging the engaging portion and the engaged portion together, no gap is formed between the container bodies, and thus the appearance is improved.

A fourth feature of the plant cultivation container according to the present invention lies in that a distance between the right and left walls becomes shorter towards a rear of the container body.

<Effect>

According to this configuration, a shape of the container body seen from above is a sector, and thus a degree of freedom in changing the relative angle in a direction that makes the front faces of the two adjacent container bodies away from each other is set larger as compared with the container body in which a distance between right and left walls is constant.

A fifth feature of the plant cultivation container according to the present invention lies in that the container body includes: a first feed-water inlet for supplying the plant cultivation water to the water reservoir portion; and a second feed-water inlet for supplying the plant cultivation water to the water reservoir portions of at least one of two adjacent container bodies, when a plurality of the container bodies are arranged in the lateral direction.

<Effect>

According to this configuration, by feeding water to a single plant cultivation container, the plant cultivation containers adjacent to the water-fed plant cultivation container can be supplied with water, and thus water can be efficiently supplied to a plurality of the plant cultivation containers.

DESCRIPTION OF EMBODIMENTS

Hereinbelow, embodiments of the plant cultivation container according to the present invention will be described with reference to the drawings.

Figure 1:
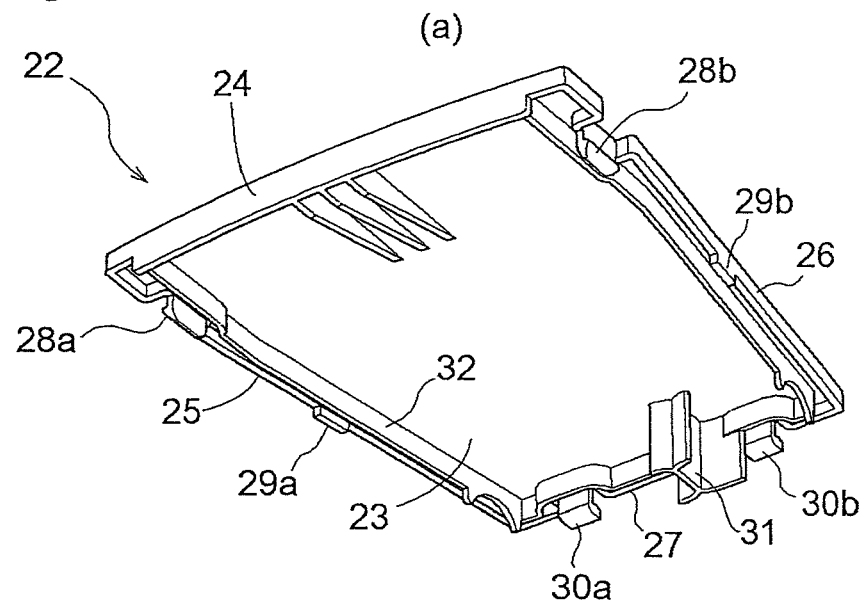
FIG. 1 is a perspective view of a container body and a lid member therefor.
Figure 1:
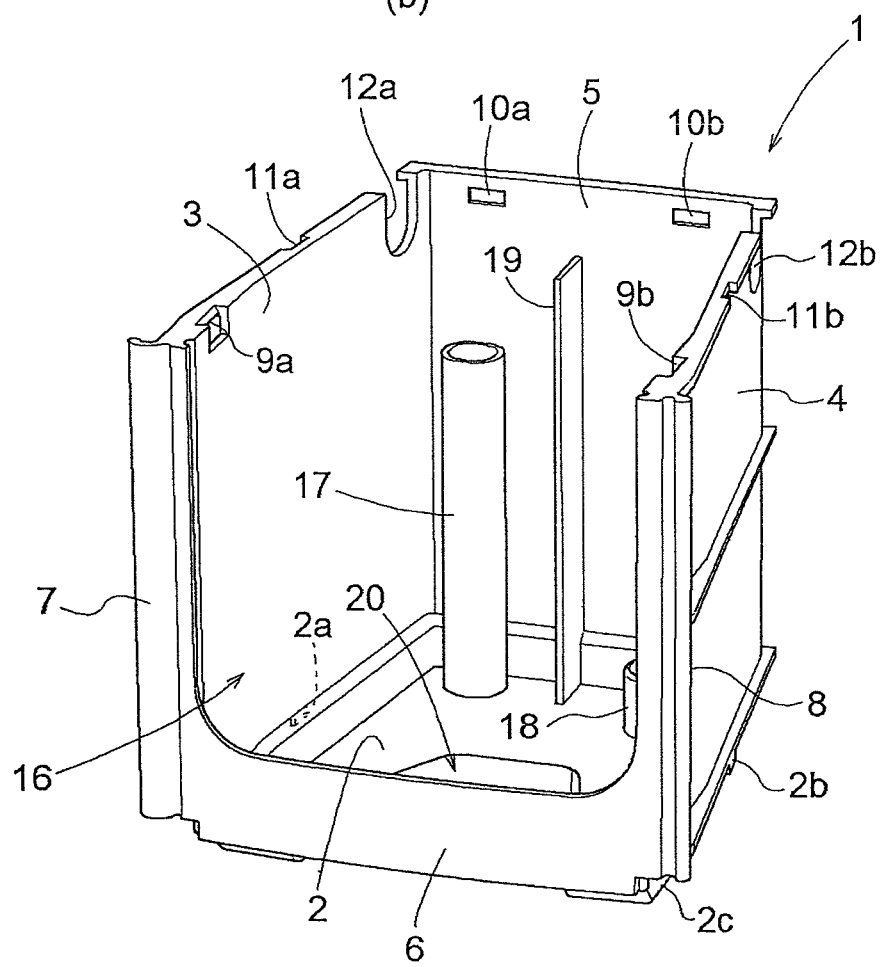
Figure 2:
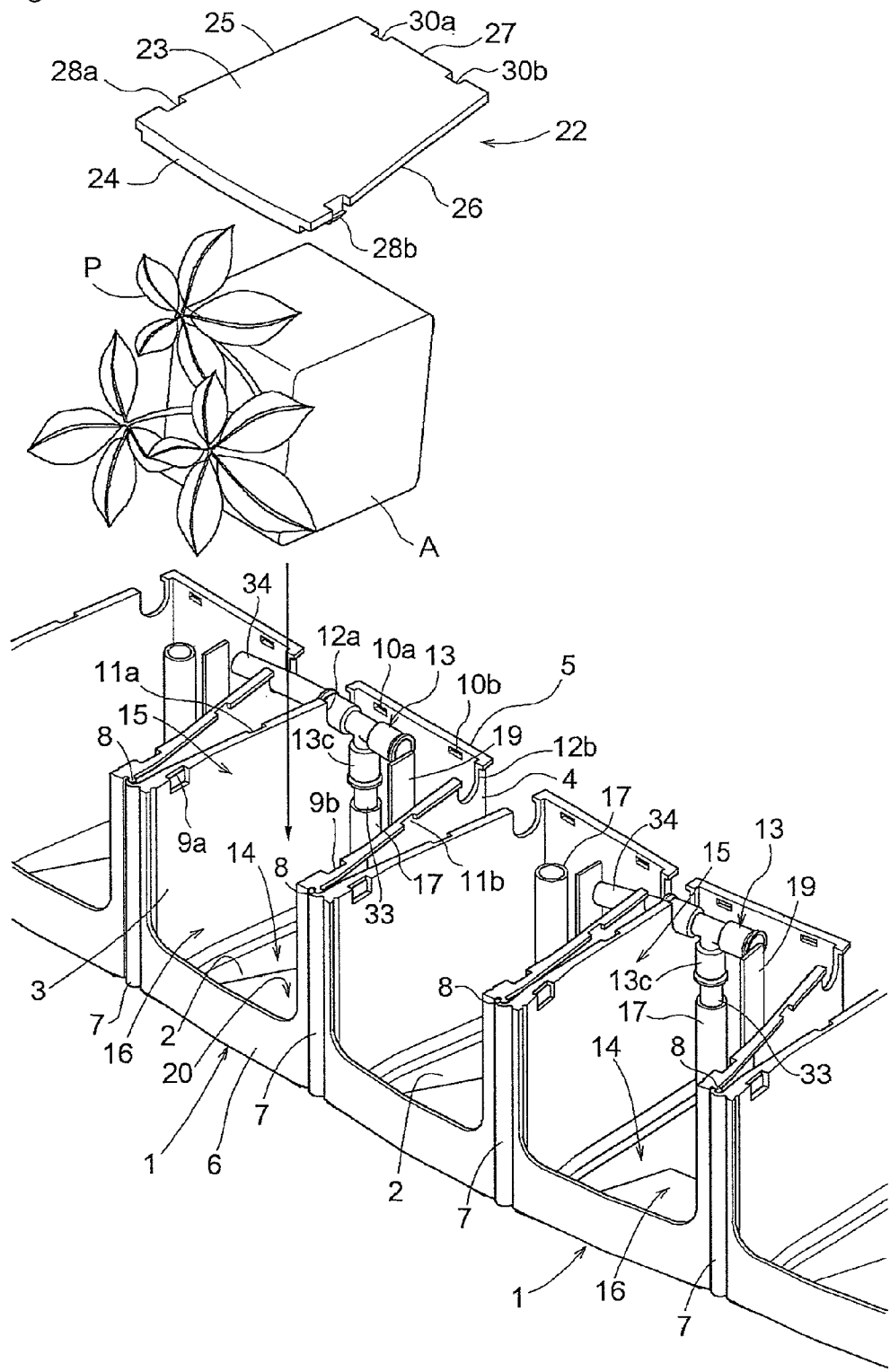
FIG. 2 is a perspective view showing a plurality of the container bodies arranged in a lateral direction.

As shown in FIGS. 1 and 2, the plant cultivation container according to the present invention includes a container body 1 made of synthetic resin. The container body 1 includes a bottom wall 2, a right wall 3, a left wall 4, a rear wall 5 and a front wall 6, which are integrally formed. The right wall 3, the left wall 4, the rear wall 5 and the front wall 6 are vertically disposed from the respective four sides of the bottom wall 2. In addition, a vertical length of the front wall 6 is set so as to be shorter than the vertical lengths of any of the right wall 3, the left wall 4 and the rear wall 5. The bottom wall 2, the right wall 3, the left wall 4, the rear wall 5, the front wall 6 and a lid member 22 or the bottom wall 2 of another container body 1 arranged immediately above together form a plant cultivation space 15 for cultivating a plant P. The container body 1 in the present embodiment is configured in such a manner that a distance between the right wall 3 and the left wall 4 becomes shorter towards a rear of the container body 1, as a planar view. It should be noted that it is desirable that a standing angle β (see FIG. 7) between the right wall 3 and the left wall 4 is 15°.

As shown in FIG. 1, upper end front portions of the respective right and left walls 3,4 are provided with respective first locked portions 9a,9b to which respective first locking pieces 28a,28b of the lid member 22 are locked. Upper end intermediate portions of the respective right and left walls 3,4 are provided with respective recesses 11a,11b. Into the recesses 11a,11b, respective projections 29a,29b of the lid member 22, or respective projections 2a,2b of another container body 1 arranged immediately above can be fitted.

An upper end rear portion of the right wall 3 is provided with a recess 12a for inserting a second feed-water inlet 13b (see FIG. 3) of a T-tube 13. An upper end rear portion of the left wall 4 is provided with a recess 12b for inserting a feed-water tube 34 (see FIG. 2) of another plant cultivation container located on the immediate left.

A center portion in a lateral direction of the rear wall 5 is provided with a longitudinal rib 19 extending in a vertical direction. Upper right and left portions of the rear wall 5 are provided with respective second locked holes 10a,10b to which respective second locking pieces 30a,30b of the lid member 22 are locked.

Figure 6:
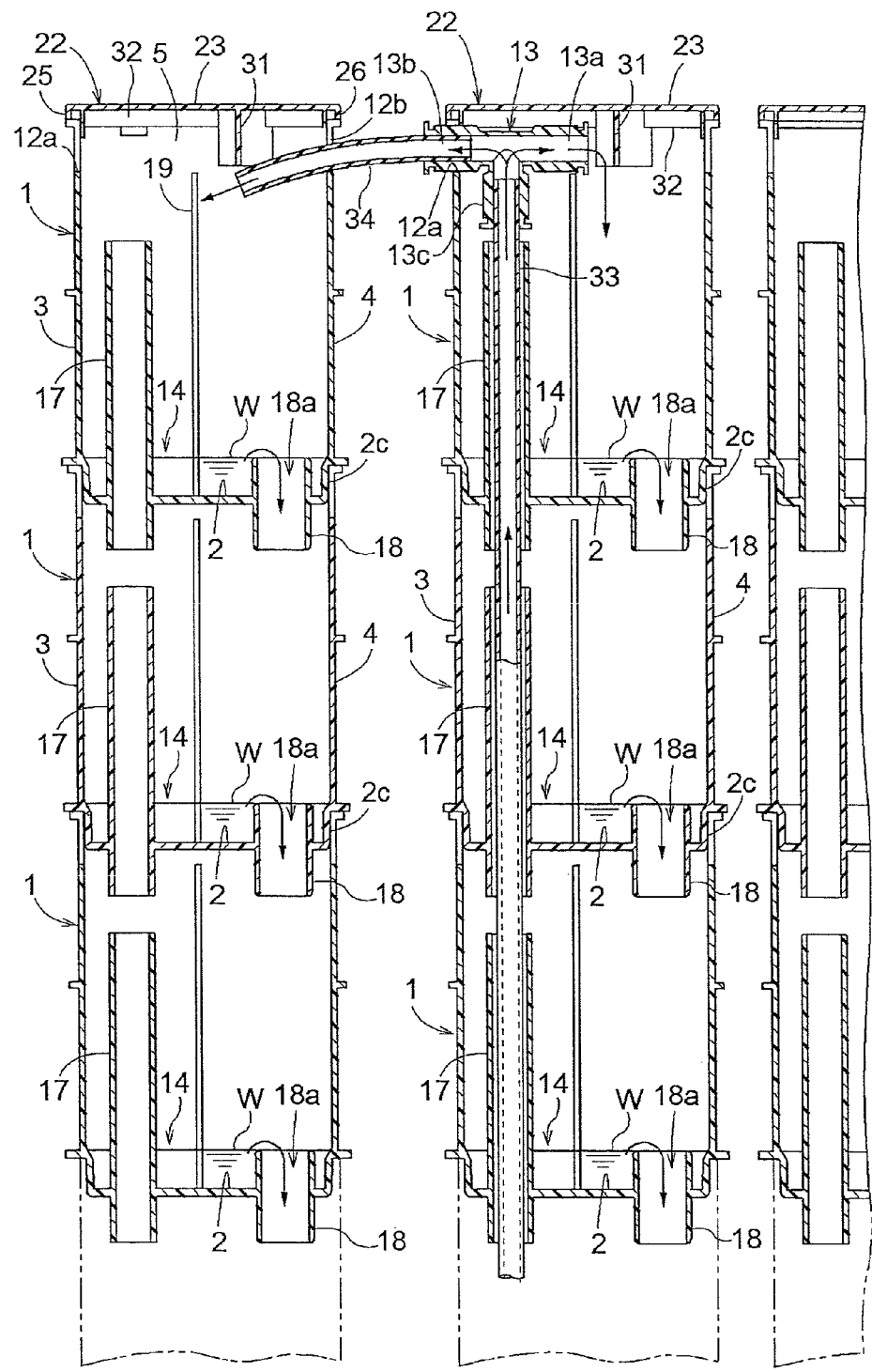
FIG. 6 is a longitudinal sectional front view of a plurality of the container bodies arranged in the vertical direction.

As shown in FIG. 6, rear right and left portions of the bottom wall 2 of the container body 1 are provided with a hollow long barrel 17 and a hollow short barrel 18, respectively, which are integrally formed in such a manner that they vertically penetrates the bottom wall 2.

The long barrel 17 is a feed-water tube for allowing plant cultivation water W to flow therein. The short barrel 18 is provided with an overflow drainage outlet 18a for retaining the plant cultivation water W in a water reservoir portion 14 at a predetermined amount or lower.

Figure 5:
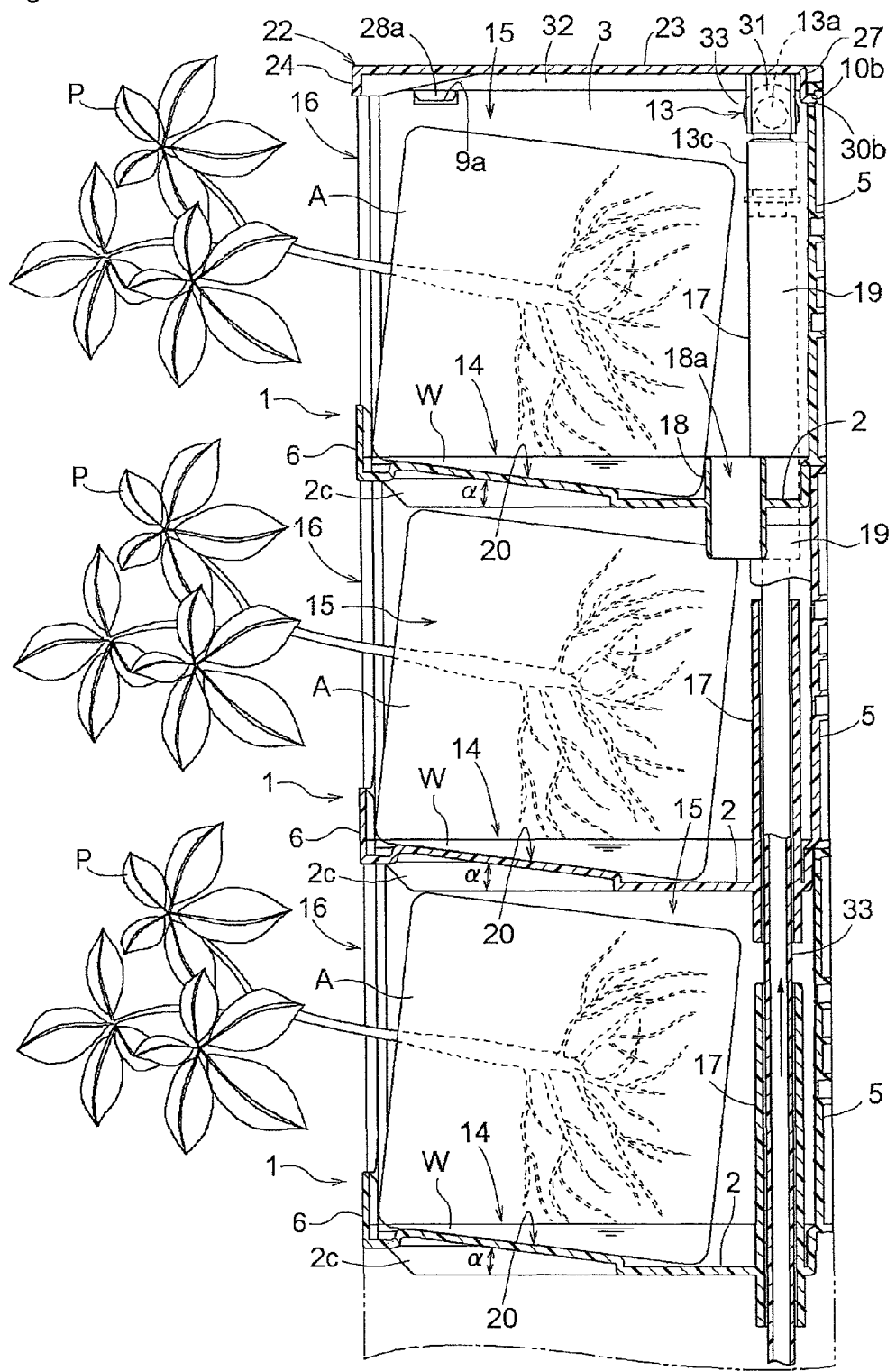
FIG. 5 is a longitudinal sectional side view of a plurality of the container bodies arranged in a vertical direction.

As shown in FIG. 5, when the lid member 22 or another container body 1 is attached to an upper face of the container body 1, the plant cultivation space 15 is formed, and at the same time, an opening 16 is formed in a front face of the container body 1. It should be noted that a lower part of the plant cultivation space 15, i.e. a space surrounded by the bottom wall 2, the right wall 3, the left wall 4, the rear wall 5, and the front wall 6 of the container body 1 serves as the water reservoir portion 14 for pooling the plant cultivation water W.

As shown in FIG. 5, in the plant cultivation space 15, a plant cultivation flooring material A is mounted. The plant cultivation flooring material A is formed of a water absorption material, such as sponge. A shape of the plant cultivation flooring material A is not limited, and may be, for example, cube, rectangular parallelepiped, column or the like. The longitudinal rib 19 of the rear wall 5 functions as a member for restricting a front-rear movement of the plant cultivation flooring material A in the plant cultivation space 15. In other words, the plant cultivation flooring material A comes into contact with the longitudinal rib 19 and thus is never disposed further rearward, and therefore, the drainage outlet 18a is prevented from being blocked by the plant cultivation flooring material A.

The bottom wall 2 as a carrying face 20 of the plant cultivation flooring material A, or in other words the bottom wall 2 of the water reservoir portion 14, is formed as an inclined surface tilting at an inclined angle α, in such a manner that a portion closer to the opening 16 of the plant cultivation space 15 is positioned higher and a portion more away from the opening 16 is positioned lower.

As shown in FIG. 1, the lid member 22 includes a top panel 23, a front wall 24, a right wall 25, a left wall 26 and a rear wall 27, which are integrally formed. The front wall 24, the right wall 25, the left wall 26 and the rear wall 27 are vertically disposed from the respective four sides of the top panel 23. Recesses formed in the respective front portions of the respective right and left walls 25,26 of the lid member 22 are provided with respective first locking pieces 28a,28b. Intermediate portions of the respective right and left walls 25,26 are provided with the respective projections 29a,29b. Recesses formed on the respective right and left sides of the rear wall 27 are provided with the respective second locking pieces 30a,30b. In addition, in a rear intermediate portion in the lateral direction of the top panel 23 of the lid member 22, a guide portion 31 having an H-cross section is provided to stand. In portions of the top panel 23 at positions inside relative to the right wall 25, the left wall 26, and the rear wall 27, an inner wall portion 32 is provided to stand along these walls.

When the lid member 22 is placed on and pressed against an upper face opening of the container body 1, the first locking piece 28a of the right wall 25 and the first locking piece 28b of the left wall 26 are locked to the first locked portion 9a of the right wall 3 and the first locked portion 9b of the left wall 4 of the container body 1, respectively, and at the same time, the projection 29a of the right wall 25 and a projection 29b of the left wall 26 are fitted into the recess 11a of the right wall 3 and the recess 11b of the left wall 4 of the container body 1, respectively, and further, the second locking piece 30a on the right side and the second locking piece 30b on the left side of the rear wall 27 are locked and fixed to the second locked hole 10a on the right side and the second locked hole 10b on the left side of the rear wall 5 of the container body 1, respectively.

The inner wall portion 32 and the guide portion 31 of the lid member 22 are fitted into the upper face opening formed by the right wall 3, the left wall 4 and the rear wall 5 of the container body 1. In this case, as shown in FIG. 6, a first feed-water inlet 13a of the T-tube 13 faces against a right side face of the guide portion 31.

As shown in FIGS. 1 and 2, in a front end portion of the right wall 3, an engaging portion 7 is formed along an entire height of the container body 1. In addition, in a front end portion of the left wall 4, an engaged portion 8 engageable with the engaging portion 7 of another container body 1 is formed along the entire height of the container body 1.

Figure 3:
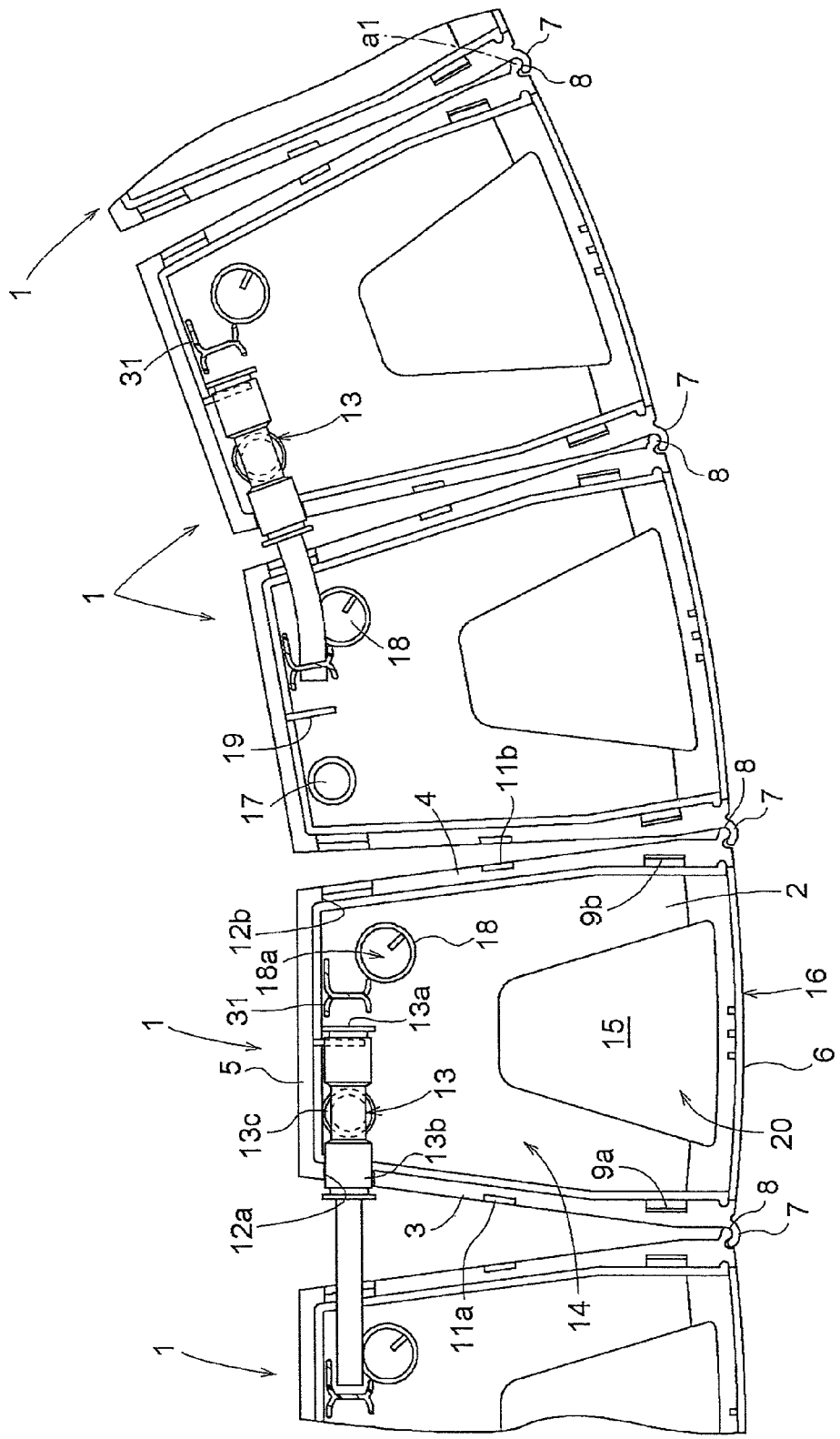
FIG. 3 is a plan view showing a plurality of the container bodies arranged in the lateral direction.

As shown in FIGS. 2 and 3, when a plurality of the container bodies 1 are arranged in the lateral direction with the opening 16 of the plant cultivation space 15 oriented in the same direction, by engaging the engaging portion 7 of the container body 1 with the engaged portion 8 of another container body 1, two adjacent container bodies 1 are engaged in such a manner that a relative angle therebetween is changeable.

For example, in the container body 1, one configuration may be assumed in which the engaging portion 7 and the engaged portion 8 are provided in respective intermediate portions in a front-rear direction of the right wall 3 and the left wall 4, respectively (hereinbelow, this case is referred to as "imaginary configuration"). Unlike this imaginary configuration, in the case of the container body 1 in the present embodiment, when the relative angle is changed in a direction that makes the front faces of the two adjacent container bodies 1 close to each other, the front end portions of the respective right wall 3 and the left wall 4 of the container bodies 1 are never brought into contact with each other. Accordingly, the container body 1 in the present embodiment has a large degree of freedom in changing the relative angle, as compared with the imaginary configuration.

Further in the present embodiment, the distance between the right wall 3 and the left wall 4 becomes shorter towards the rear of the container body 1, and a shape of the container body 1 seen from above is a sector. Accordingly, a degree of freedom in changing the relative angle in a direction that makes the front faces of the two adjacent container bodies 1 away from each other is set larger as compared with the container body in which the distance between the right wall 3 and the left wall 4 is constant.

Figure 4:
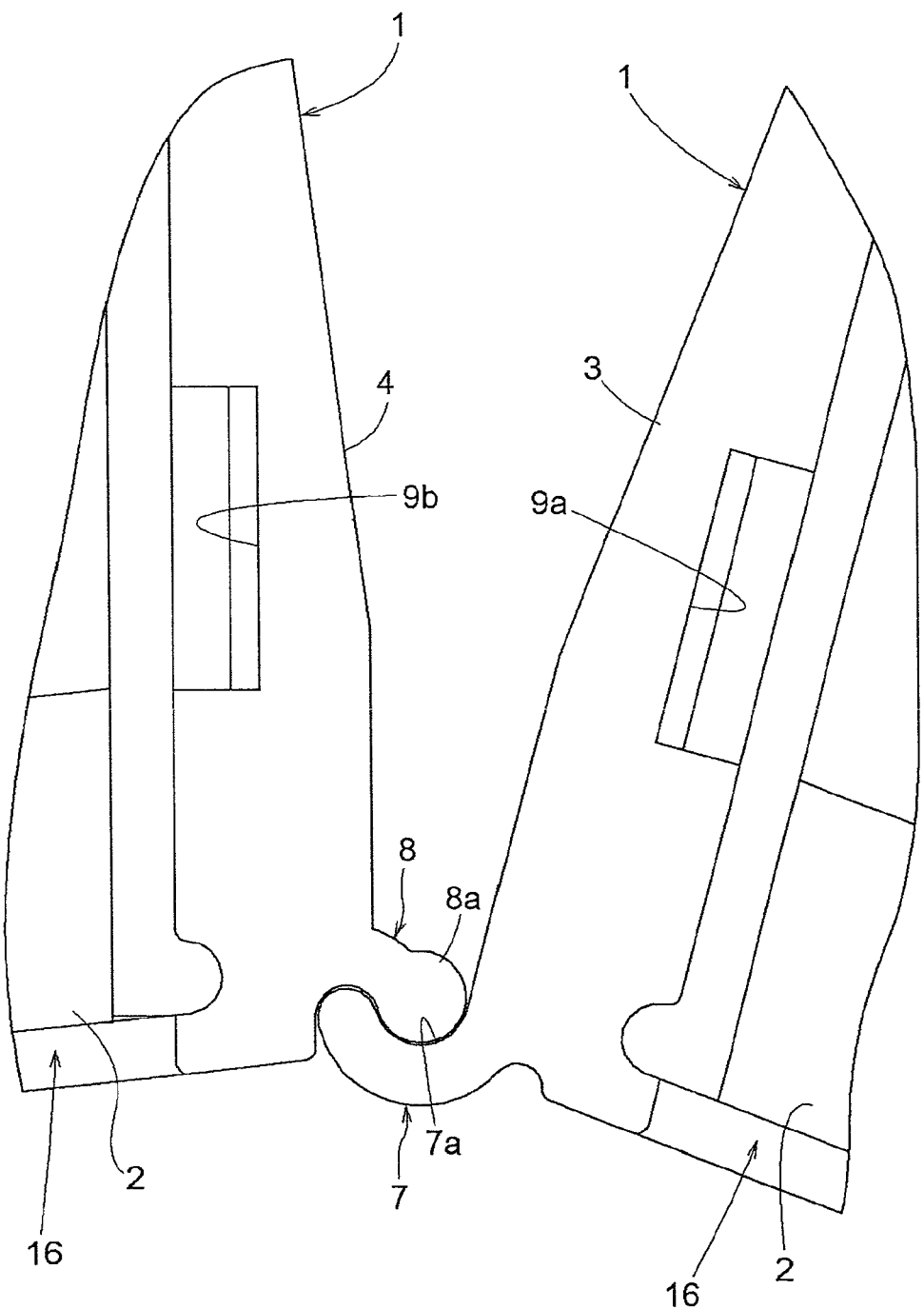
FIG. 4 is a plan view showing an engagement state between an engaging portion and an engaged portion.

As shown in FIG. 4, the engaging portion 7 has a cross section in a shape of an arc, while the engaged portion 8 has a cross section in a shape of a smooth curve formed of recess and projection. By placing a circular-shaped projection 8a of the engaged portion 8 of another container body 1 into an arc-shaped inner curved surface 7a of the engaging portion 7 of the container body 1, the engaging portion 7 of the container body 1 is engaged with the engaged portion 8 of another container body 1.

In this state, the container body 1 and another container body 1 next thereto are disposed in such a manner that the relative angle is changeable, from a position at which the left wall 4 of the container body 1 and the right wall 3 of another container body 1 are brought into contact with each other, to a position at which the front face of the container body 1 and the front face of another container body 1 orthogonally crosses to form an approximate L-shape as a planar view.

In addition, as shown in FIGS. 5 and 6, the container bodies 1 can be stacked in the vertical direction while the openings 16 of the plant cultivation spaces 15 are oriented in the same direction. In other words, when the container bodies 1 are stacked in the vertical direction, a lower face of the bottom wall 2 of the container body 1 located above is brought into contact with an upper rims of the right wall 3, the left wall 4 and the rear wall 5 of the container body 1 located below. Then, a step portion 2c of the bottom wall 2 of the container body 1 located above is fitted into the upper face opening of the container body 1 located below. Further, though not shown, the projections 2a,2b of the bottom wall 2 of the container body 1 located above are fitted into the recesses 11a,11b, respectively, of the container body 1 located below.

Next, a way of using the plant cultivation container will be described.

As shown in FIGS. 2 and 3, a plurality of the container bodies 1 are arranged in a lateral direction along an outer wall of a building, and the engaging portion 7 and the engaged portion 8 of two adjacent container bodies 1 are engaged. In this case, the relative angle between the two adjacent container bodies 1 can be freely changed, and thus the container bodies 1 may be arranged linearly, or may be arranged along a curved outer wall portion having a curvature in the lateral direction.

Then, in each of the container body 1, the plant cultivation flooring material A is placed, to thereby form a first row (lowermost row) of the plant cultivation containers. It should be noted that the plant cultivation container in the first row is supported by a base portion (not shown) disposed immediately below. The base portion is a rectangular member mountable on a floor or the like. The plant cultivation container in the first row is fixed with the step portion 2c of the container body 1 being inserted into an upper face opening of the base portion (not shown).

Figure 7:
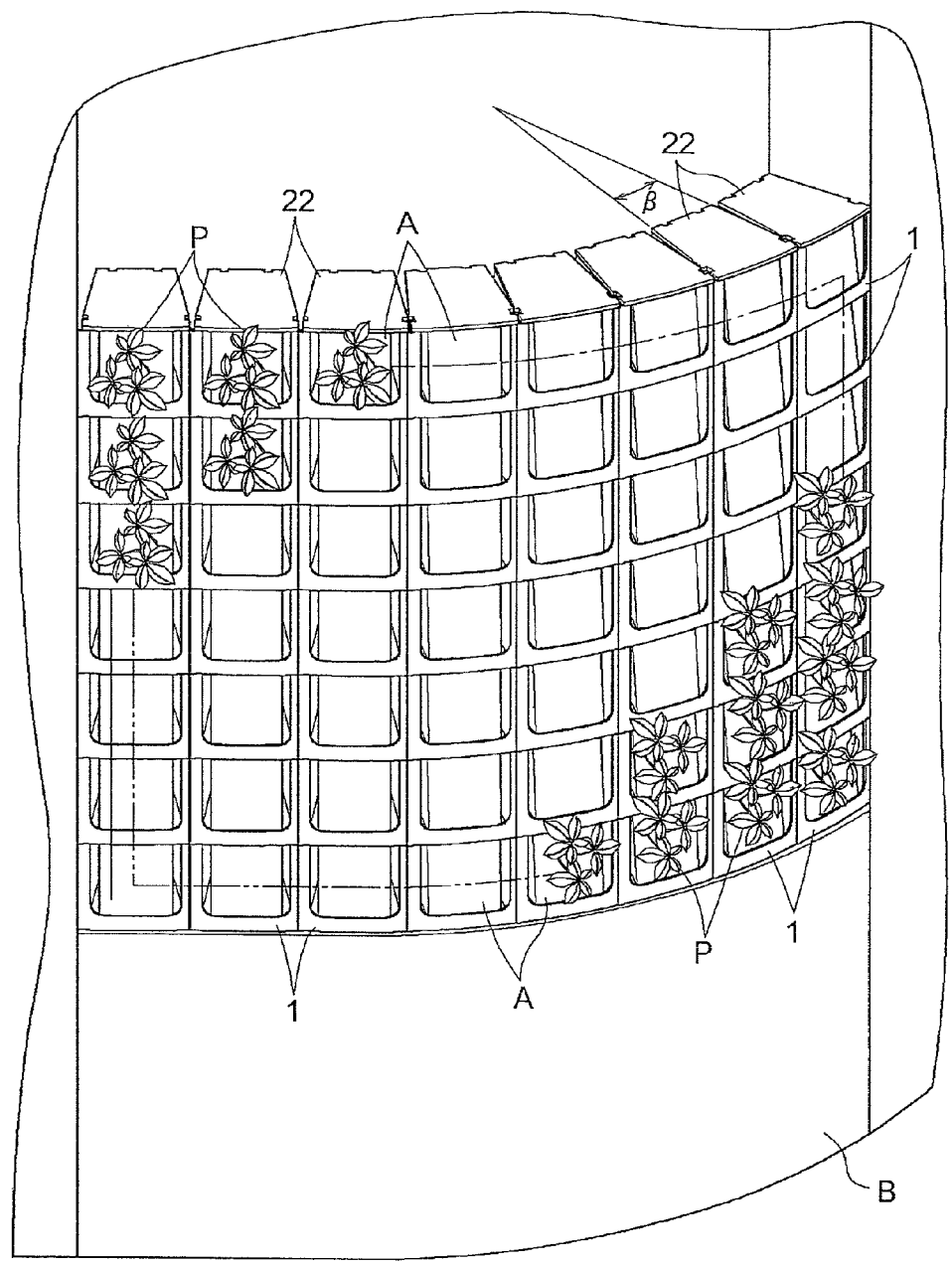
FIG. 7 is a perspective view of a wall of the plant cultivation containers formed along an outer wall of a building having a curvature in the lateral direction.

Next, on the plant cultivation container in the first row, the container bodies 1 of a second row, a third row, a fourth row, . . . are stacked up to a certain height so as to cover the outer wall of the building, and the engaging portion 7 and the engaged portion 8 of the two adjacent container bodies 1 are engaged together, as shown in FIG. 7, to thereby form a wall of the plant cultivation containers having a curved surface along a curved face B of the outer wall portion having a curvature in the lateral direction.

Next, from an upper end of the long barrel 17 of each of second, fourth, . . . 2n th (n is natural number) container body 1 counted from the container body 1 at a right end in an uppermost row, a feed-water hose 33 having an outer diameter which is smaller than an inner diameter of the long barrel 17 is inserted into the long barrel 17, until the feed-water hose 33 comes out from a lower end portion (portion projecting from the bottom wall 2) of the long barrel 17 of the container body 1 in the first row, which is then connected to a feed-water pump (not shown).

Then, as shown in FIGS. 2, 3 and 6, the T-tube 13 is attached to an end portion of the feed-water hose 33, which projects from the upper end of the long barrel 17 of the container body 1 in the uppermost row. In this case, the end portion of the feed-water hose 33 is fitted into a connection part 13c of the T-tube 13 and at the same time, the second feed-water inlet 13b of the T-tube 13 is disposed in the recess 12a of the right wall 3 in such a manner that an end portion of the second feed-water inlet 13b projects from the right wall 3.

The feed-water tube 34 is fitted into and connected to the projecting second feed-water inlet 13b of the T-tube 13, and inserted into the recess 12b of the left wall 4 of the container body 1 positioned on the right. In this case, the feed-water tube 34 is disposed so that the end portion faces a left face of the longitudinal rib 19 of the container body 1 positioned on the right.

Finally, as shown in FIG. 2, inside each of the container bodies 1 in the uppermost row, the plant cultivation flooring material A is placed, and the lid member 22 is fitted from above into the upper face opening of each of the container body 1, to complete the assembly.

Supply of the plant cultivation water W can be performed by sending water to the feed-water hose 33 with the feed-water pump (not shown). In this case, as shown in FIG. 6, the plant cultivation water W rises through the feed-water hose 33 by an action of the pump. When the plant cultivation water W rising through the feed-water hose 33 reaches the long barrel 17 of the plant cultivation container in the uppermost row, the plant cultivation water W branches into a flow on a first feed-water inlet 13a-side and a flow on a second feed-water inlet 13b-side, in the T-tube 13 at the upper end thereof.

The plant cultivation water W discharged from the first feed-water inlet 13a of the T-tube 13 hits the right side face of the guide portion 31 of the lid member 22 and is supplied to the water reservoir portion 14 positioned below. On the other hand, the plant cultivation water W discharged from the second feed-water inlet 13b of the T-tube 13 passes through the feed-water tube 34, hit the left face of the longitudinal rib 19 of the plant cultivation container positioned on the right, and is supplied to the water reservoir portion 14 positioned below.

When a reservoir water level in the water reservoir portion 14 of the plant cultivation container in the uppermost row reaches a height level of the drainage outlet 18a of the short barrel 18, the plant cultivation water W overflows into the drainage outlet 18a, and flows down to the water reservoir portion 14 of the container body 1 located immediately below. Then, overflow is repeated subsequently in the lower plant cultivation containers, and finally the plant cultivation water W is supplied to all of the water reservoir portions 14 of the respective plant cultivation containers.

Then, the plant cultivation water W overflowed from the plant cultivation container in the first row is pooled in the base portion (not shown), or a water storage tank (not shown) disposed outside the base portion. If necessary, for example, the plant cultivation water W may be circulated by resending the plant cultivation water W stored in the water storage tank to the feed-water hose 33 by the pump.

As described above, since the plant cultivation flooring material A is placed in such a manner that a portion thereof is immersed in the plant cultivation water W in the water reservoir portion 14, the plant cultivation water W is absorbed by the plant cultivation flooring material A, and supplied to a root of the plant P present in the plant cultivation flooring material A. Accordingly, the root of the plant P can absorb the plant cultivation water W to allow the plant P to grow in the plant cultivation container.

The bottom wall 2 as the carrying face 20 for mounting the plant cultivation flooring material A is formed as an inclined surface at the inclined angle α, in such a manner that a portion closer to the opening 16 of the plant cultivation space 15 is positioned higher and a portion more away from the opening 16 is positioned lower. Therefore, as shown in FIG. 5, the plant cultivation flooring material A is immersed more deeply in the plant cultivation water W at a position more away from the opening 16, and immersed more shallowly in the plant cultivation water W at a position closer to the opening 16. Depending on the amount of the plant cultivation water W in the water reservoir portion 14, there may be some portions that are not immersed in the plant cultivation water W.

With this configuration, a large rhizosphere in which the root of the plant P is to grow can be secured. In addition, by supplying a satisfactory amount of the plant cultivation water W to the rhizosphere in which the plant P has grown, the plant can grow more excellently.

<Other Embodiments>

(1) The engaging portion 7 and the engaged portion 8 in the above-described embodiment may be provided in the left wall 4 and the right wall 3, respectively, which is opposite to the case of the above-described embodiment. In addition, the positions of the engaging portion 7 and the engaged portion 8 are not limited to the front end portions of the right wall 3 and the left wall 4, and any position in the right wall 3 and the left wall 4 can be taken, as long as the two adjacent container bodies 1 can engage with each other while the relative angle therebetween is changeable.

(2) The second feed-water inlet 13b of the T-tube 13 in the above-described embodiment may be further branched so as to supply the plant cultivation water W to the two container bodies 1 adjacent on the right and left.

(3) The plant cultivation container of the above-described embodiment may be arranged as a single row (one stack in the vertical direction).

(4) The distance between the right wall 3 and the left wall 4 in the container body 1 of the above-described embodiment may be configured in such a manner that it becomes shorter towards a front of the container body 1.

INDUSTRIAL APPLICABILITY

The present invention is applicable not only to a wall greening structure of the building, but also to a roof greening structure or the like, and is suitable especially for a case where the present invention is applied to the outer wall having a curvature in the lateral direction.

REFERENCE SIGNS LIST

1 Container body
3 Right wall
4 Left wall
7 Engaging portion
8 Engaged portion
13 T-tube
13a First feed-water inlet
13b Second feed-water inlet
14 Water reservoir portion
15 Plant cultivation space
16 Opening
W Plant cultivation water
A Plant cultivation flooring material

The invention claimed is:

1. A plant cultivation container comprising a container body having: a plant cultivation space with an opening for planting a plant formed in a front face thereof; and a water reservoir portion for pooling plant cultivation water formed in a lower portion of the plant cultivation space, in which container a water-absorbing plant cultivation flooring material is mounted in the plant cultivation space so that a part of the plant cultivation flooring material is positioned inside the water reservoir portion, wherein one of right and left walls of the container body disposed at right and left ends, respectively, of a front face of the container body is provided with an engaging portion, and the other of the right and left walls is provided with an engaged portion engageable with the engaging portion of another container body, and when a plurality of the container bodies are arranged in a lateral direction, two adjacent container bodies are engageable with each other through engagement between the engaging portion of one container body and the engaged portion of the other container body, while allowing change of a relative angle therebetween.

2. The plant cultivation container according to claim 1, wherein a front end portion of one of the right and left walls of the container body is provided with the engaging portion and a front end portion of the other is provided with the engaged portion engageable with the engaging portion of another container body.

3. The plant cultivation container according to claim 2, wherein a distance between the right and left walls becomes shorter towards a rear of the container body.

4. The plant cultivation container according to claim 3, wherein the container body comprises:
   a first feed-water inlet for supplying the plant cultivation water to the water reservoir portion; and
   a second feed-water inlet for supplying the plant cultivation water to the water reservoir portions of at least one of two adjacent container bodies, when a plurality of the container bodies are arranged in the lateral direction.

5. The plant cultivation container according to claim 2, wherein the engaging portion and the engaged portion are formed along an entire height of the container body.

6. The plant cultivation container according to claim 5, wherein a distance between the right and left walls becomes shorter towards a rear of the container body.

7. The plant cultivation container according to claim 6, wherein the container body comprises:
   a first feed-water inlet for supplying the plant cultivation water to the water reservoir portion; and
   a second feed-water inlet for supplying the plant cultivation water to the water reservoir portions of at least one of two adjacent container bodies, when a plurality of the container bodies are arranged in the lateral direction.

8. The plant cultivation container according to claim 5, wherein the container body comprises:
   a first feed-water inlet for supplying the plant cultivation water to the water reservoir portion; and
   a second feed-water inlet for supplying the plant cultivation water to the water reservoir portions of at least one of two adjacent container bodies, when a plurality of the container bodies are arranged in the lateral direction.

9. The plant cultivation container according to claim 2, wherein the container body comprises:
   a first feed-water inlet for supplying the plant cultivation water to the water reservoir portion; and
   a second feed-water inlet for supplying the plant cultivation water to the water reservoir portions of at least one of two adjacent container bodies, when a plurality of the container bodies are arranged in the lateral direction.

10. The plant cultivation container according to claim 1, wherein the engaging portion and the engaged portion are formed along an entire height of the container body.

11. The plant cultivation container according to claim 10, wherein the container body comprises:
    a first feed-water inlet for supplying the plant cultivation water to the water reservoir portion; and
    a second feed-water inlet for supplying the plant cultivation water to the water reservoir portions of at least one of two adjacent container bodies, when a plurality of the container bodies are arranged in the lateral direction.

12. The plant cultivation container according to claim 1, wherein the container body comprises:
    a first feed-water inlet for supplying the plant cultivation water to the water reservoir portion; and
    a second feed-water inlet for supplying the plant cultivation water to the water reservoir portions of at least one of two adjacent container bodies, when a plurality of the container bodies are arranged in the lateral direction.

* * * * *